United States Patent [19]

Matsuda et al.

[11] 4,211,566
[45] Jul. 8, 1980

[54] ANTIFOULING METHOD

[75] Inventors: Sumio Matsuda, Osaka; Hajime Kudara, Shiga, both of Japan

[73] Assignee: Chugoku Marine Paints Ltd., Hiroshima, Japan

[21] Appl. No.: 952,366

[22] Filed: Oct. 18, 1978

Related U.S. Application Data

[63] Continuation-in-part of Ser. No. 768,654, Feb. 14, 1977, abandoned.

[51] Int. Cl.$^2$ .............................................. C09D 5/16
[52] U.S. Cl. .................................... 106/16; 106/18.35; 424/288
[58] Field of Search ............ 106/15 R, 16, 278, 18.35; 424/288, 212; 260/429.7, 45.75 T

[56] References Cited

U.S. PATENT DOCUMENTS

| | | | |
|---|---|---|---|
| 2,641,551 | 6/1953 | Smith et al. | 106/14.34 |
| 4,066,462 | 1/1978 | Horiguchi et al. | 106/14.34 |

FOREIGN PATENT DOCUMENTS

| | | | |
|---|---|---|---|
| 46-13393 | 8/1971 | Japan | 428/288 |
| 48-41258 | 5/1973 | Japan | 106/14 |

*Primary Examiner*—Lorenzo B. Hayes
*Attorney, Agent, or Firm*—John C. Smith, Jr.

[57] ABSTRACT

Disclosed is a method for preventing the adhesion of marine animals and plants to the bottom of ships comprising applying thereto an antifouling coating composition containing vehicle materials and, as an antifouling agent, an organotin compound having the formula [I],

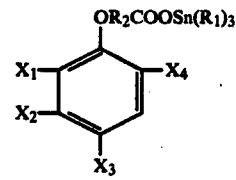

(wherein $R_1$ is an alkyl group having from one to eight carbon atoms and an aryl group having from six to eight carbon atoms, $R_2$ is an alkylene group having from one to four carbon atoms, and each of $X_1$, $X_2$, $X_3$ and $X_4$ is a component chosen from the group of hydrogen, bromine, chlorine, iodine and methyl radical, provided that at least one of $X_1$, $X_2$, $X_3$ and $X_4$ is bromine, chlorine or iodine).

9 Claims, No Drawings

ANTIFOULING METHOD

This application is a continuation-in-part of Ser. No. 768,654, filed Feb. 14, 1977, now abandoned.

The present invention relates to a novel antifouling coating composition, and more particularly, relates to an antifouling coating composition containing, as an antifouling agent, special tin-containing organic compounds.

It is known in the art that, among organotin compounds, trialkyltin derivatives such as, for example, trialkyltin oxide, trialkyltin chloride, and triphenyltin derivatives, such as, for example, triphenyltin oxide, triphenyltin chloride have effects as a germicide and an antifouling agent. However, these compounds are not completely effective as an antifouling agent for coating compositions or paints. Antifouling agents have a strong effect with respect to marine animals, shellfish and the like seem to have the tendency of having a relatively less effect with respect to marine plants or seaweed. Even though an antifouling agent which can completely protect against the adhesion of marine life (e.g. marine animals and plants) to the bottoms of ships over a long period is eagerly desired in the world, it has not been developed yet and, therefore, the development of such antifouling agent is still very important.

Accordingly, an object of the present invention is to provide novel antifouling compositions which are capable of effectively preventing the adhesion of both marine animals and plants to the bottoms of ships.

Another object of the present invention is to provide antifouling agents and a method for the preparation thereof.

These and other objects of the present invention which will become apparent from the detailed description hereinbelow, can be attained by the present invention.

In accordance with the present invention, there is provided an antifouling coating composition for preventing the adhesion of both marine animals and plants to the bottoms of ships comprising (a) at least one coating resin, (b) an antifouling effective amount of at least one organotin compound having the general formula [I]

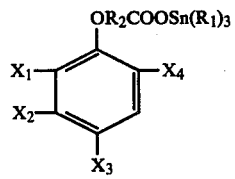

(wherein $R_1$ is an alkyl group having from one to eight carbon atoms and an aryl group having from six to eight carbon atoms, $R_2$ is an alkylene group having from one to four carbon atoms, and each of $X_1$, $X_2$, $X_3$ and $X_4$ is a component chosen from the group of hydrogen, chlorine, bromine, iodine and methyl radical, provided that at least one of $X_1$, $X_2$, $X_3$ and $X_4$ is bromine, chlorine or iodine) and (c) at least one solvent.

Said organotin compounds used, as an antifouling agent, in the present antifouling agent typically include those having the general formula [II] or [III],

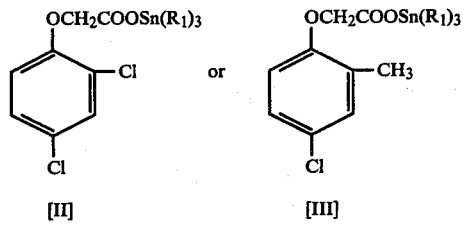

(wherein $R_1$ is the same as defined above.)

These compounds can be prepared by the reaction of organotin compounds having the general formula [IV], $$(R_1)_3SnX_5 \qquad [IV]$$

(wherein $R_1$ is the same as defined above and $X_5$ is Cl, Br, I, OH and 1/2 O) with appropriate organic carboxylic acids.

Thus, it has been found that, by the combination of said organotin compound [IV] with the appropriate carboxylic acid, the organotin compound [I] having a synergetic antifouling effect can be developed.

The organotin compound of the formula, $(R_1)_3SnX_5$ includes, for example, trialkyltin halides, such as trimethyltin chloride, bromide or iodide, triethyltin chloride, bromide or iodide, tripropyltin chloride, bromide or iodide, tributyltin chloride, bromide or iodide, trihexyltin chloride, bromide or iodide and trioctyltin chloride, bromide or iodide; trialkyltin oxides, such as the oxide of trimethyltin, triethyltin, tripropyltin, tributyltin, trihexyltin or trioctyltin; triaryltin halides such as triphenyltin chloride, bromide or iodide; triaryltin hydroxides, such as triphenyltin hydroxide; triaryltin oxides such as triphenyltin oxide.

The specified organic carboxylic acid typically includes, for example, 2,4-dichlorophenoxy acetic acid (which is known as a pesticide uses and is called "2,4-D"), 2-methyl-4-chlorophenoxy acetic acid (which is also known as a herbicide and is called "M.C.P.") and the like.

For instance, triphenyltin salt of 2,4-dichlorophenoxy acetic acid prepared by, for example, the following reaction (1) of triphenyltin hydroxide with 2,4-dichlorophenoxy acetic acid, strongly, prevents the adhesion of marine animals and plants to the bottoms of ships.

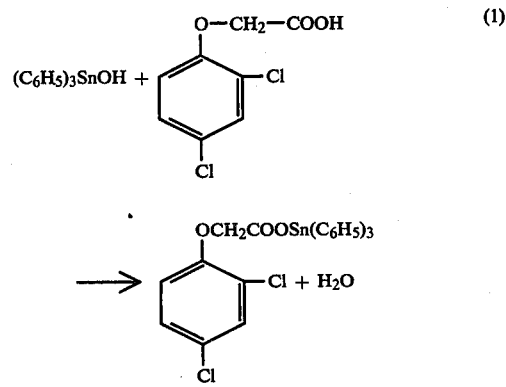

Tributyltin salt of 2-methyl-4-chlorophenoxy acetic acid prepared by, for example, the following reaction (2) of tributyltin oxide with 2-methyl-4-chlorophenoxy acetic acid, also has an antifouling effect similar to that of the above-mentioned compound prepared by the reaction (1).

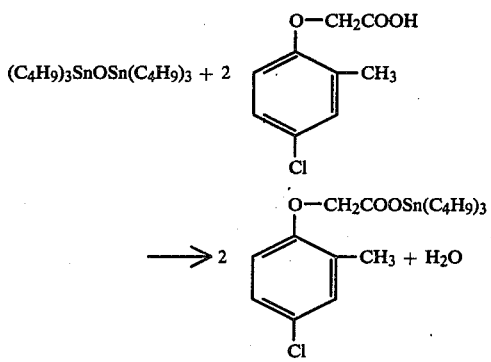

Although the tributyltin salt is only slightly soluble in water and most organic solvents the triphenyltin salt is less soluble in water and organic solvents than the tributyl salt. Further, a mixture of triphenyltin salt and tributyltin salt of 2,4-dichlorophenoxy acetic acid in any ratio has a larger antifouling effect compared with each compound alone. The same phenomenon is obtained in a mixture of tributyltin salts of 2,4-dichlorophenoxy acetic acid and 2-methyl-4-chlorophenoxy acetic acid. Accordingly, the antifouling coating compositions containing these compounds or a mixture thereof as an antifouling agent not only have a strong antifouling effect but also an extremely long durability in the sea. Dipping tests in the sea show that coating the bottoms of ships with the present antifouling coating composition can effectively prevent the adhesion of any marine animals and plants thereto.

The antifouling coating composition according to the present invention preferably comprises (a) 10 through 25% by weight of the coating resin, (b) 3 through 30% by weight of the organotin compound, (c) 30 through 50% by weight of the solvent, and (d) 20 through 50% by weight of a pigment. The preferable amount of the organotin compound is 10 through 20% by weight. These ingredients can be easily blended with each other in the conventional manner.

The coating resin incorporated into the present antifouling coating composition includes those which are usually used, as a vehicle material, in the conventional coating composition. Examples of such resins are natural resins such as rosin, copal, asphalt, tung oil, linseed oil and the like and synthetic resin such as poly(vinyl chloride), acrylic resin, alkyd resin, polyacrylnitrile, epoxy resin, polyester, polystyrene and the like.

The solvent incorporated into the present antifouling coating composition includes those which are usually used, as a solvent, in the conventional coating composition. Examples of such solvents are methyl ethyl ketone, methyl isobutyl ketone, xylol, toluol, butyl cellosolve and the like.

The pigment incorporated into the present antifouling coating composition includes those which are usually used, as a pigment, in the conventional coating composition. Examples of such pigments are titanium white, red iron oxide, talc, zinc oxide, copper oxide, silica and the like.

In addition to the above-mentioned ingredients, other additives such as, for example, a surface active agent, a stabilizer, a dryer, an anti-settle agent, a sayging agent and the like can be also incorporated into the present antifouling coating composition in the conventional manner.

When the amount of the antifouling agent is less than the above-mentioned lower limit, the antifouling effect will not remain for a long period. When the amount of the antifouling agent is more than the above-mentioned upper limit, problems in handling the coating composition and in cost will occur.

The present invention is further illustrated by, but by no means limited to, the following examples.

EXAMPLE 1

One mole of triphenyltin hydroxide, one mole of 2,4-dichlorophenoxy acetic acid (2,4-D) and 5 g of p-toluene sulfonic acid ($CH_3$—$C_6H_4$—$SO_3H$) were charged into a reaction vessel together with 500 ml of toluene. The reaction mixture thus prepared was boiled. When the toluene was distilled off, the water which was produced by the reaction of triphenyltin hydroxide and 2,4-dichlorophenoxy acetic acid was separated as an axeotropic mixture whereby the reaction further proceeded. The product was obtained in the form of white powder, which would only slightly dissolve in water and organic solvents. The antifouling compound A thus obtained was triphenyltin salt of 2,4-dichlorophenoxy acetic acid which is represented by the following formula.

Antifouling Agent A

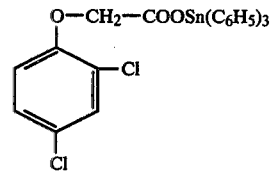

EXAMPLE 2

One mole of tributyltin oxide and two moles of 2-methyl-4-chlorophenoxy acetic acid (M.C.P.) were reacted in the manner as described in Example 1. The antifouling compound B thus prepared was tributyltin salt of 2-methyl-4-chlorophenoxy acetic acid, which is represented by the following formula.

Antifouling Agent B

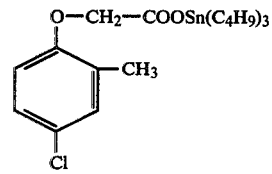

EXAMPLE 3

The preparation of an antifouling agent C was repeated as in Example 2 except that one mole of 2,4-dichlorophenoxy acetic acid and one mole of 2-methyl-4-chlorophenoxy acetic acid were substituted for the two moles of 2-methyl-4-chlorophenoxy acetic acid in Example 2.

This antifouling agent C was a mixture of tributyltin salt of 2,4-D and tributyltin salt of M.C.P.

Antifouling Agent C

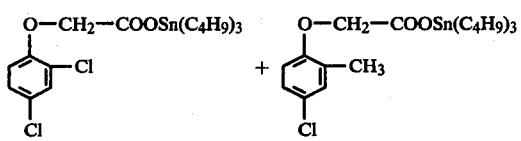

EXAMPLE 4

One mole of triphenyltin hydroxide, a half mole of tributyltin oxide and two moles of 2,4-dichlorophenoxy acetic acid are reacted in the manner as described in Example 1. Thus, an antifouling agent D which comprised a mixture of triphenyltin salt of 2,4-D and tributyltin salt of 2,4-D was obtained.

Antifouling Agent D

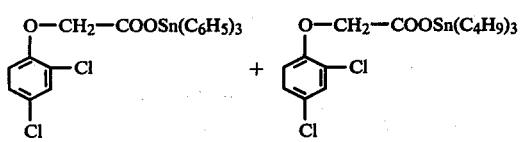

EXAMPLE 5

The antifouling agents A, B, C and D prepared as mentioned above were independently compounded into antifouling coating compositions A, B, C and D, respectively, in accordance with the following list.

| Ingredients | Parts by weight |
| --- | --- |
| Antifouling Agent A,B,C or D | 10 |
| Rosin | 15 |
| Poly (vinyl chloride) | 15 |
| Methyl isobutyl ketone | 20 |
| Xylol | 20 |
| Titanium white (rutile type) | 15 |
| Talc | 5 |

The above-mentioned ingredients were mixed together and were thoroughly blended with each other in a roller mill, for 40 minutes, at a temperature of about 25° C. Thus, the antifouling coating compositions A, B, C and D were obtained.

As comparative examples, samples X and Y having the following composition were also prepared in the manner as described above.

| | Sample X (parts by weight) | Sample Y (parts by weight) |
| --- | --- | --- |
| Cuprous oxide | 20 | — |
| Triphenyltin hydroxide | — | 10 |
| Rosin | 15 | 15 |
| Poly (vinyl chloride) | 10 | 15 |
| Methyl isobutyl ketone | 15 | 20 |
| Xylol | 20 | 20 |
| Titanium white (rutile type) | 15 | 15 |
| Talc | 5 | 5 |

The antifouling ability of the antifouling coating compositions A through D and of the comparative compositions X and Y was evaluated in the sea-dipping test during periods of five, ten, fifteen and twenty months after the compositions were coated, at a thickness of about 90 microns, on test pieces made of steel, each piece having a dimension of 50 mm W×100 mm L×2 mm H. The results are shown in the following Table 1 in which percent ratios of the area where marine animals and marine plants were adhered thereto during the test periods to the whole area of the dipped test pieces are listed.

Table 1

| Composition | Dipping Period (months) | | | |
| --- | --- | --- | --- | --- |
| No. | 5 | 10 | 15 | 20 |
| A | 0 | 0 | 0 | 0 |
| B | 0 | 0 | 0 | 0 |
| C | 0 | 0 | 0 | 0 |
| D | 0 | 0 | 0 | 0 |
| X * | 0 | 3 | 21 | 65 |
| Y * | 0 | 1 | 8 | 29 |

* Comparative Examples

EXAMPLE 6

Antifouling coating compositions E through H were pepared by using the antifouling agents A through D in accordance with the following list, in the same manner as described in Example 5.

| Antifouling Coating | (Parts by weight) | | | |
| --- | --- | --- | --- | --- |
| Composition | E | F | G | H |
| Antifouling Agent A | 10 | — | — | — |
| Antifouling Agent B | — | 10 | — | — |
| Antifouling Agent C | — | — | 10 | — |
| Antifouling Agent D | — | — | — | 10 |
| Rosin | 15 | 15 | 15 | 15 |
| Poly (methacrylbutylate) | 15 | 15 | — | — |
| Poly (acrylbutyrate) | — | — | 15 | 15 |
| Methyl isobutyl ketone | 20 | 20 | 20 | 20 |
| Xylol | 20 | 20 | 20 | 20 |
| Titanium white | 15 | 15 | 15 | 15 |
| Talc | 5 | 5 | 5 | 5 |

When the antifouling ability of these antifouling coating compositions E through H was evaluated in the same manner as described in Example 5, no adhesion of marine animals and marine plants was observed after twenty months.

EXAMPLE 7

This Example illustrates that germicides or pesticides are not effective as an anfifouling agent for preventing the adhesion of both marine animals (such as shellfish) and marine plants (such as seaweed) to the bottom of ships.

The compounds I, J, K and L shown in the following Table 2 were compounded into compositions I, J, K and L, respectively, in accordance with list in Example 5, except that the antifouling agent A, B, C or D was replaced by the compound I, J, K or L. These compositions I through L were evaluated in the sea-dipping test as described in Example 5. The results are shown in the following Table 2.

Table 2

| Composition | Compound | Dipping Period (month) | | | |
| --- | --- | --- | --- | --- | --- |
| No. | No. | 5 | 10 | 15 | 20 |
| I | I * | 0 | 0 | 0 | 0 |
| J | J ** | 100 | — | — | — |
| K | K *** | 0 | 20 | 100 | — |

Table 2-continued

| Composition No. | Compound No. | Dipping Period (month) | | | |
|---|---|---|---|---|---|
| | | 5 | 10 | 15 | 20 |
| L | L *** | 10 | 50 | 100 | — |

* Tributylin salt of 2-methyl-4-chlorophenoxy acetic acid (the present antifouling agent)
** 2-methyl-4-chlorophenoxy acetic acid (M.C.P.)
*** Tributyltin oxide
**** A mixture of 2 moles of the compound J and 1 mole of the compound K.

From the above-mentioned results, it is clear that the compound J (i.e. herbicide), the compound K (i.e. insecticide) and a mixture thereof (i.e. the compound L) were not effective as an antifouling agent for preventing the adhesion of both marine animals and marine plants. Contrary to this, the compound I of the present invention, which is derived from the compounds J and K, has an excellent antifouling ability for preventing the adhesion of both marine animals and marine plants.

What we claim is:

1. In a method for preventing the adhesion of both marine animals and plants to the bottoms of ships comprising applying to the bottoms of ships a coating composition comprising
at least one coating resin, at least one solvent, a pigment and an antifouling agent; the improvement comprising, as said agent,
an antifouling effective amount of at least one organotin compound having the general formula [I]

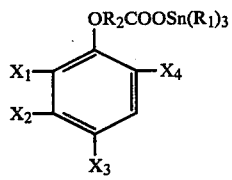

wherein $R_1$ is an alkyl group having from one to eight carbon atoms or an aryl group having from six to eight carbon atoms, $R_2$ is an alkylene group having from one to four carbon atoms, and each of $X_1$, $X_2$, $X_3$ and $X_4$ is a component selected from the group of hydrogen, bromine, chlorine, iodine and methyl radical; provided that at least one of $X_1$, $X_2$, $X_3$ and $X_4$ is bromine, chlorine or iodine.

2. The method as claimed in claim 1 wherein said organotin compound has the general formula [II]

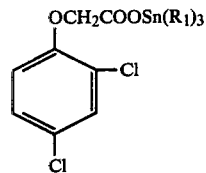

wherein $R_1$ is an alkyl group having from one to eight carbon atoms or an aryl group having from six to eight carbon atoms.

3. The method as claimed in claim 1 wherein said organotin compound has the general formula [III]

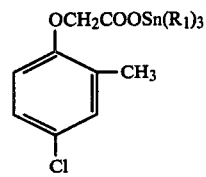

wherein $R_1$ is an alkyl group having from one to eight carbon atoms or an aryl group having from six to eight carbon atoms.

4. The method as claimed in claim 1 wherein said coating resin is selected from the group consisting of natural resin and synthetic resin.

5. The method as claimed in claim 4 wherein said natural resin is selected from the group consisting of rosin, copal and asphalt.

6. The method as claimed in claim 4 wherein said synthetic resin is selected from the group consisting of poly(vinyl chloride), acrylic resin, alkyd resin, polyacrylnitrile, epoxy resin, polyester and polystyrene.

7. The method as claimed in claim 1 wherein said solvent is selected from the group consisting of methyl ethyl ketone, methyl isobutyl ketone, xylol, toluol and butyl cellosolve.

8. the method as claimed in claim 1 wherein said pigment is selected from the group consisting of titanium white, red iorn oxide, talc, zinc oxide, copper oxide and silica.

9. the method as claimed in claim 1 wherein said composition contains
10 through 25% by weight of the coating resin,
3 through 30% by weight of the organotin compound,
30 through 50% by weight of the solvent, and
20 through 50% by weight of the pigment.

* * * * *